United States Patent
Yu et al.

(10) Patent No.: US 10,440,160 B2
(45) Date of Patent: Oct. 8, 2019

(54) SCRAMBLE OF PAYLOAD AND PREAMBLE IN 10SPE WITH SYNCHRONOUS AND SELF-SYNCHRONOUS SCRAMBLING

(71) Applicant: Microchip Technology Incorporated, Chandler, AZ (US)

(72) Inventors: Jiachi Yu, Shenzhen (CN); Dixon Chen, Shenzhen (CN); Hongming An, San Diego, CA (US); John Zang, Shenzhen (CN); Kevin Yang, Shenzhen (CN)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/007,176

(22) Filed: Jun. 13, 2018

(65) Prior Publication Data

US 2019/0268453 A1    Aug. 29, 2019

Related U.S. Application Data

(60) Provisional application No. 62/637,656, filed on Mar. 2, 2018, provisional application No. 62/635,859, filed on Feb. 27, 2018.

(51) Int. Cl.
  *H04L 29/08*   (2006.01)
(52) U.S. Cl.
  CPC ......... *H04L 69/324* (2013.01); *H04L 69/323* (2013.01)

(58) Field of Classification Search
  CPC ........................... H04L 69/324; H04L 69/323
  See application file for complete search history.

(56) References Cited

U.S. PATENT DOCUMENTS

| | | | |
|---|---|---|---|
| 2002/0061012 A1 | 5/2002 | Thi et al. | 370/352 |
| 2007/0086423 A1 | 4/2007 | Zeng et al. | 370/349 |
| 2009/0063936 A1 | 3/2009 | Kanda et al. | 714/776 |
| 2009/0303972 A1* | 12/2009 | Flammer, III | H04B 1/7143 370/338 |

OTHER PUBLICATIONS

Tazebay, "Transmit Emission Considerations for 10BASE-T1S", IEEE 802.3cg Task Force, Jan. 22, 2018.*
Zang, John et al., "10BASE-T1S Scrambler Analysis," Microchip Technology Incorporated, IEEE 802.3cg Rosemont Meeting, 36 pages, Mar. 6, 2018.
International Search Report and Written Opinion, Application No. PCT/US2019/019711, 18 pages, dated May 20, 2019.

* cited by examiner

*Primary Examiner* — Siming Liu
(74) *Attorney, Agent, or Firm* — Slayden Grubert Beard PLLC

(57) ABSTRACT

An apparatus includes an encoder circuit and a scrambler circuit configured to receive a frame, the frame including a preamble and a payload. The scrambler circuit is further configured to scramble contents of the frame including the payload and at least a portion of the preamble, provide synchronization information with results of scrambling the contents, and send results of scrambling the contents to the encoder circuit.

20 Claims, 3 Drawing Sheets

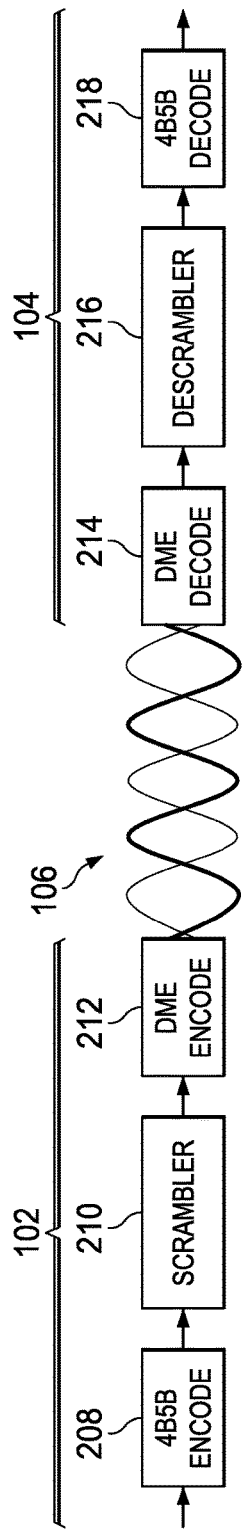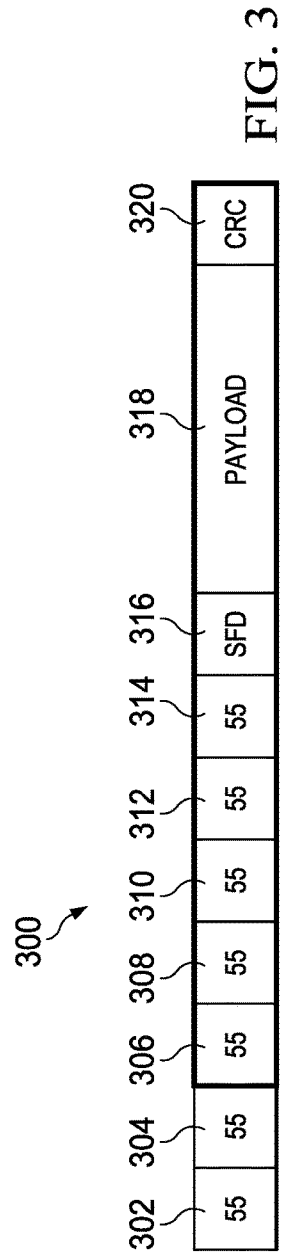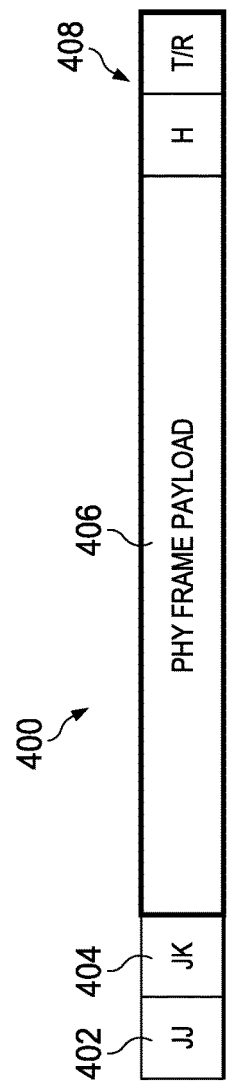

SCRAMBLE OF PAYLOAD AND PREAMBLE IN 10SPE WITH SYNCHRONOUS AND SELF-SYNCHRONOUS SCRAMBLING

PRIORITY

This application claims priority to U.S. Provisional Application No. 62/635,859 filed Feb. 27, 2018, and to U.S. Provisional Application No. 62/637,656 filed Mar. 2, 2018, the contents of which are hereby incorporated in their entirety.

FIELD OF THE INVENTION

The present disclosure relates to Ethernet communications and, more particularly, to serial communications and, more particularly, to scrambling payload and preamble with synchronous and self-synchronous scrambling in IEEE 802.3cg communication, also known as Single Twisted Pair Ethernet, 10SPE, or 10BASE-TIS.

BACKGROUND

10SPE is a proposed standard currently under revision and development. 10SPE defines Ethernet local area, access and metropolitan area networks. Ethernet is specified at selected speeds of operation; and uses a common media access control (MAC) specification and management information base (MIB). The Carrier Sense Multiple Access with Collision Detection (CSMA/CD) MAC protocol specifies shared medium (half duplex) operation, as well as full duplex operation. Speed specific Media Independent Interfaces (MIIs) provide an architectural and optional implementation interface to selected Physical Layer entities (PHY). The Physical Layer encodes frames for transmission and decodes received frames with the modulation specified for the speed of operation, transmission medium and supported link length. Other specified capabilities include: control and management protocols, and the provision of power over selected twisted pair PHY types.

10SPE specifies additions to and appropriate modifications of IEEE Std. 802.3 to add 10 Mb/s Physical Layer (PHY) specifications and management parameters for operation, and associated optional provision of power, on single balanced twisted-pair copper cabling.

SUMMARY

Embodiments of the present disclosure may include an apparatus. The apparatus may include an encoder circuit and a scrambler circuit. The scrambler circuit may be configured to receive a frame. The frame may include a preamble and a payload. The scrambler circuit may be configured to scramble contents of the frame including the payload and at least a portion of the preamble, provide synchronization information with results of scrambling the contents, and send results of scrambling the contents to the encoder circuit. In combination with any of the above embodiments, the synchronization information may include data from the start or completion of scrambling in the scrambler circuit. In combination with any of the above embodiments, the synchronization information may include data from shift registers of the scrambler circuit. In combination with any of the above embodiments, the scrambler circuit may be further configured to replace data fields of the frame with the synchronization information. In combination with any of the above embodiments, the scrambler circuit may be further configured to replace data fields of the preamble of the frame with the synchronization information.

Embodiments of the present disclosure may include an article of manufacture. The article may include machine-readable instructions on a non-transitory machine-readable medium. The instructions, when loaded and executed by a processor, may cause the processor to receive a frame. The frame may include a preamble and a payload. The instructions may cause the processor to scramble contents of the frame including the payload and at least a portion of the preamble, provide synchronization information with results of scrambling the contents, and send results of scrambling the contents to the encoder circuit. In combination with any of the above embodiments, the synchronization information may include data from the start or completion of scrambling in the scrambler circuit. In combination with any of the above embodiments, the synchronization information may include data from shift registers of the scrambler circuit. In combination with any of the above embodiments, the instructions may cause the processor to replace data fields of the frame with the synchronization information. In combination with any of the above embodiments, the instructions may cause the processor to replace data fields of the preamble of the frame with the synchronization information.

Embodiments of the present disclosure may include another apparatus. The apparatus may include a decoder circuit and a descrambler circuit. The descrambler circuit may be configured to receive a frame from the decoder circuit, the frame including a preamble and a payload. The descrambler circuit may be further configured to identify synchronization information in the frame, and, using the synchronization information, descramble contents of the frame including the payload and at least a portion of the preamble. In combination with any of the above embodiments, the synchronization information may include data from the start or completion of scrambling to generate the frame. In combination with any of the above embodiments, the synchronization information may include data from shift registers of a scrambler circuit that generated the frame. In combination with any of the above embodiments, the descrambler circuit may be further configured to identify data fields of the frame that were replaced with the synchronization information. In combination with any of the above embodiments, the descrambler circuit may be further configured to use the synchronization information to populate shift registers of the descrambler circuit.

Embodiments of the present disclosure may include another article of manufacture. The article may include machine-readable instructions on a non-transitory machine-readable medium. The instructions, when loaded and executed by a processor, may cause the processor to receive a frame from the decoder circuit, the frame including a preamble and a payload. The article may further include instructions configured to cause the processor to identify synchronization information in the frame, and, using the synchronization information, descramble contents of the frame including the payload and at least a portion of the preamble. In combination with any of the above embodiments, the synchronization information may include data from the start or completion of scrambling to generate the frame. In combination with any of the above embodiments, the synchronization information may include data from shift registers of a scrambler circuit that generated the frame. In combination with any of the above embodiments, the article may further include instructions configured to cause the processor to identify data fields of the frame that were replaced with the synchronization information. In combination with any of the above embodiments, the article may further include instructions configured to use the synchronization information to populate shift registers of the descrambler circuit.

Embodiments of the present disclosure may include a device. The device may include a processor and any of the articles of manufacture disclosed above.

Embodiments of the present disclosure may include a system. The system may include any of the devices or apparatuses disclosed above.

Embodiments of the present disclosure may include a method. The method may include operations performed by any of the apparatuses, processors, systems, or devices disclosed above.

BRIEF DESCRIPTION OF THE DRAWINGS

FIG. 2 is more detailed illustration of the system for scrambling a payload and a preamble in a packetized data communication system, according to embodiments of the present disclosure.

FIG. 3 is an illustration of a data frame, such as a MAC frame, according to embodiments of the present disclosure.

FIG. 4 is an illustration of a PHY frame, according to embodiments of the present disclosure.

DETAILED DESCRIPTION

Figure 1:
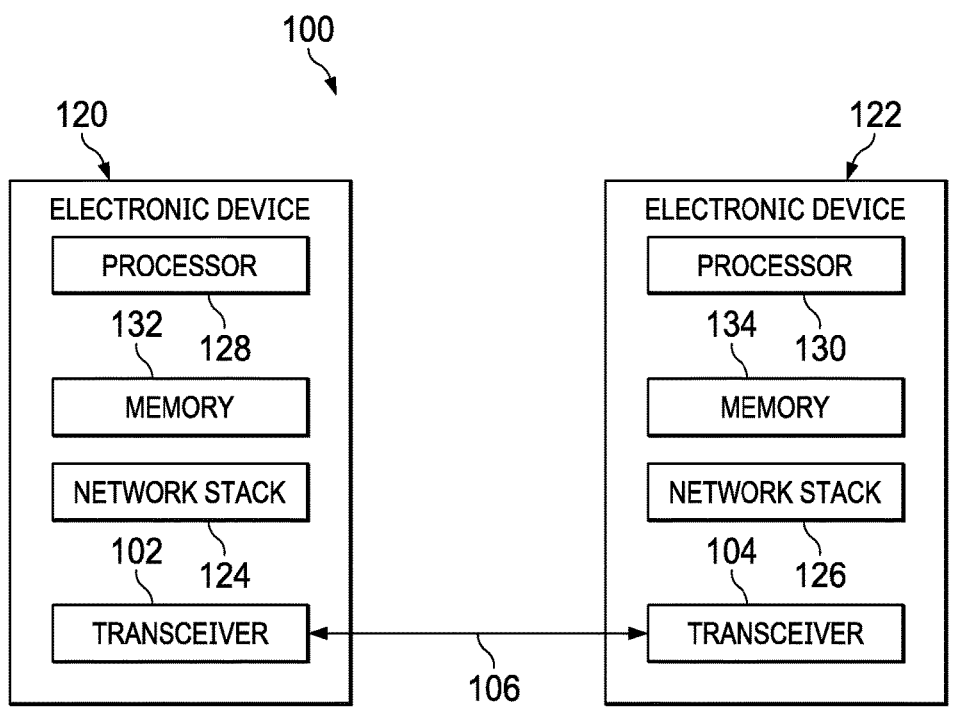
FIG. 1 is an illustration of a system for scrambling a payload and a preamble in a packetized data communication system, according to embodiments of the present disclosure.

FIG. 1 is an illustration of a system for scrambling a payload and a preamble during communication, according to embodiments of the present disclosure. System 100 may be implemented using analog circuitry, digital circuitry, instructions for execution by a processor, or any suitable combination thereof.

System 100 may include two or more suitable electronic devices 120, 122 in digital communication with one another. Electronic devices 120, 122 may be similarly or differently implemented from each other. Electronic devices 120, 122 may include, for example, computers, laptops, servers, blades, smartphones, routers, other network equipment, tablets, mobile devise, or any other suitable device.

Electronic devices 120, 122 may communicate over a network 106. Network 106 may be implemented in any suitable manner. In one embodiment, network 106 may be a packetized network. In a further embodiment, network 106 may be a 10SPE network. Electronic devices 120, 122 may communicate over network 106 by exchanging packets of data. A stream of data to be exchanged between electronic devices 120, 122 may be divided into such packets of data. An individual packet of data may include, among other fields, a preamble and a payload. The preamble may define a variety of characteristics about the packet, such as a sender, destination, synchronization, seeds, frame status, and other information. In one embodiment, network 106 may be a 10SPE system, wherein packets are exchanged via the 10SPE protocol.

Each of electronic devices 120, 122 may include, respectively, one or more processors 128, 130, one or more memories 132, 134 communicatively coupled to such processors, and network stacks 124, 126. Data to be sent between electronic devices 120, 122, may originate in applications with instructions stored in memories 132, 134 executing on processors 128, 130. Data to be sent between electronic devices 120, 122 may originate from yet other networked devices that is to be propagated through one of electronic devices 120, 122 to the other of electronic devices 120, 122. Data to be sent or received between electronic devices 120, 122 may be identified by software or hardware in network stacks 124, 126. In a layered network model, network stacks 124, 126 may implement one or more such layers.

Electronic device 120 may include a transceiver 102. Electronic device 122 may include a transceiver 104. Described as respective transceivers 102, 104, these elements may be configured to both send and receive data over network 106. Thus, transceiver 102 may also be configured to perform the operations of transceiver 104, and vice-versa.

In one embodiment, transceiver 102 and transceiver 104 may implement a PHY layer of network communication between electronic devices 120, 122. Transceiver 102 and transceiver 104 may be implemented by hardware, instructions for execution by a processor, or any suitable combination thereof. Transceiver 102 and transceiver 104 may be implemented in network interface cards, integrated circuits, a system on a chip (SoC), or other suitable form-factors. Transceiver 102 may be configured to translate data to be sent to transceiver 104 into packets and send such packets to transceiver 104. Transceiver 104 may be configured to translate data received from transceiver 102 and to make such data available for the rest of electronic device 122. Data to be transmitted may be received as transceiver 102 in the form of, for example, a MAC frame. The result of the processing of transceiver 102 may be a 10SPE frame based on such an input.

In one embodiment, transceiver 102 may be configured to scramble a payload and one or more portions of a preamble for packets sent to electronic device 122. Transceiver 104 may be configured to descramble the payload and the portions of the preamble received.

System 100 may be configured to perform scrambling to randomize the data. The randomization of the data may remove data-dependent patterns. Data-dependent patterns may include, for example, a long string of zeros, a long string of ones, or other repetitive bit strings. Such patterns of data may cause an emission in network 106 or at electronic device 122 of strong tones of interference. System 100 may perform scrambling to randomize the data and thus reduce tones.

System 100 may be configured to perform scrambling of any suitable network protocol. System 100 may be configured to perform scrambling of packetized network communication. System 100 may be configured to perform scrambling of the payload and a portion of the preamble of a packetized network communication protocol frame. The scrambling may be performed on a combination set of the payload and the portion of the preamble. The portion of the preamble to be scrambled may be a subset, wherein some of the preamble is not scrambled. System 100 may be configured to perform scrambling of 10SPE frames. System 100 may be configured to perform associated descrambling of the frames.

FIG. 2 is a more detailed illustration of system 100 for scrambling a payload and a preamble in a packetized data communication system, according to embodiments of the present disclosure.

Transceiver 102 may receive data or a frame to be sent to transceiver 104 from other parts of electronic device 120. Transceiver 102 may include a 4B5B encoder 208 configured to perform 4B/5B encoding or block coding. Any other suitable encoding may be used. In 10SPE communication, 4B/5B encoding or block coding may be specified. 4B5B encoder 208 may be implemented by any suitable combination of circuitry or instructions for execution by a processor. 4B/5B encoding may be performed according to tables or definitions specified in the 10SPE standard. Data to be sent to transceiver 104 may be first encoded using the 4B5B encoder 208.

Transceiver 102 may include a scrambler 210. Scrambler 210 may be configured to scramble part of the frame received from 4B5B encoder 208. Scrambler 210 may be implemented by any suitable combination of circuitry or instructions for execution by a processor. Scrambler 210 may scramble data received from 4B5B encoder 208.

Transceiver 102 may include a differential Manchester encoded (DME) encoder 212. DME encoder 212 may be configured to further encode the data received from scrambler 210. DME encoder 212 may be implemented by any suitable combination of circuitry or instructions for execution by a processor. DEM encoder 212 may receive scrambled data from scrambler 210. The results from DME encoder 212 may be sent to transceiver 104.

Transceiver 104 may include a DME decoder 214. DME decoder may be configured to decode the operations of DME encoder 212 and may be implemented by any suitable combination of circuitry or instructions for execution by a processor.

Transceiver 104 may include a descrambler 216. Descrambler 216 may be configured to descramble data in the complementary procedure to the way in which it was scrambled by scrambler 210 and may be implemented by any suitable combination of circuitry or instructions for execution by a processor. Descrambler 216 may receive data to be descrambled from DME encoder 212 that has been decoded.

Transceiver 104 may include a 4B5B decoder 218. 4B5B decoder 218 may be configured to perform decoding corresponding to the encoding performed by 4B5B encoder 208 and may be implemented by any suitable combination of circuitry or instructions for execution by a processor. 4B5B decoder may receive data that has been descrambled from descrambler 216.

Embodiments of the present disclosure may apply scrambling to a combination of part of the preamble in addition to the payload of a data stream or frame.

FIG. 3 is an illustration of a data frame 300, such as a MAC frame, according to embodiments of the present disclosure. Data frame 300 may be in a form produced by portions of network stacks 124, 126 on behalf of other parts of electronic devices 120, 122, such as applications running thereon. Data frame 300 may illustrate a frame in a form that arrives at encoder 208 and that is produced by decoder 218. After transformation by encoder 208 and before transformation by decoder 218, data frame 300 may be converted into a PHY frame such as those illustrated in FIGS. 4-6.

Data frame 300 may include a start frame delimiter (SFD) field 316. Data frame 300 may include a payload field 318 including data that is to be sent to the other of electronic devices 120, 122 through the respective transceivers 102, 104. Data frame 300 may include a cyclical redundancy check (CRC) field 320 based on contents of payload field 318. Before SFD field 316, data frame 300 may include other fields 302, 304, 306, 308, 310, 312, 314.

FIG. 4 is an illustration of a PHY frame 400, according to embodiments of the present disclosure. PHY frame 400 may be generated by encoder 208 and decoded by decoder 218. PHY frame 400 may represent a result of encoding data frame 300. PHY frame 400 may be the result of encoding a MAC data frame.

PHY frame 400 may include a PHY frame payload 406. PHY frame payload 406 may include contents from or derived from payload 318 of data frame 300. Moreover, PHY frame payload 406 may include contents from or derived from fields 306, 308, 310, 312, 314, 316, 320 of data frame 300.

PHY frame 400 may include fields 402, 404. Fields 402 (labeled JJ) and 404 (labeled JK) may be octets or words defined by the 4B/5B encoding scheme in the 10SPE standard. These fields may be produced by encoder 208 and interpreted by decoder 218.

PHY frame 400 may include a CRC/H/T/R field 408. CRC/H/T/R field 408 may include a cyclical redundancy check (CRC), checksum, or other computational result of a mathematical operation performed on PHY frame payload 406, or portions thereof. CRC/H/T/R field 408 may also include or be followed by an H/T/R designation, indicating one of three cases: ESD (end of stream delimiter); ESDOK (end of stream delimiter ok); or ESDERR (end of stream delimiter error).

In one embodiment, some or all of PHY frame payload field 406 may be scrambled for 10SPE communication. Such scrambling may be performed by scrambler circuit 210. Once scrambled and transmitted, the scrambled portions of PHY frame payload field 406 may be descrambled by descrambler 218. To successfully descramble a received PHY frame 400, descrambler 216 in receiver may need to synchronize with scrambler 210. Descrambler 216 may start with a seed from or also used by scrambler 210. Descrambler 216 and scrambler 210 may use one or more techniques to share such a seed or other start point so that scrambling and descrambling are synchronized.

In one embodiment, data scrambling between scrambler 210 and descrambler 216 may be conducted in a self-synchronizing manner. In a self-synchronizing case, scrambler 210 and descrambler 216 may each use a predetermined, known initial data set. The predetermined, known initial data set may be loaded into the scrambler or descrambler circuit before operating. In such a case, scrambler 210 and descrambler 216 may reset to the initial data set upon each operation. As a result, scrambler 210 and descrambler 216 may initialize to a known, fixed state (such as the initial data set) every time a frame is transmitted or received.

In some other cases, a PHY frame 400 may indicate whether to reset to the known initial data set or whether to continue to use the last status of the shift registers (or other mechanism) of the scrambler and descrambler circuit. A sender of PHY frame 400 may mark such a designation in PHY frame 400. When scrambler 210 utilizes the existing or latest state of its registers to begin scrambling subsequent information, this may be considered continuing rotation in frames. Scrambler 210 and descrambler 216 may be configured to perform continuing rotation in frames after an initial data set loading. The continuing rotation in frames may be performed for a predetermined or selected number of frames, time, until a time-out, or upon request by scrambler 210 or descrambler 216.

In another embodiment, data scrambling between scrambler 210 and descrambler 216 may be conducted in a synchronous scrambling manner. In a synchronous scrambling case, PHY frame 400 may include an initial data set, seed, or continuing data set that is to be loaded by descrambler 216 in order to synchronously descramble the payload. The initial data set, seed, or continuing data set may be provided by scrambler 210. In the synchronous scrambling case when a seed is sent, in subsequent transmissions and receiving operations, scrambler 210 and descrambler 216 may be configured to continue rotation in frames, wherein scrambler 210 and descrambler 210 utilize the existing or latest state of their respective registers to begin scrambling or descrambling subsequent frames. The continuing rotation in frames may be performed for a predetermined or selected number of frames, time, until a time-out, or upon request by scrambler 210 or descrambler 216. Furthermore, descrambler 216 may become synchronous with scrambler 210 by scrambler 210 feeding its register set information (upon completion of scrambling) to descrambler 216. Scrambler 210 may accomplish this by providing such register set information in PHY frame 400. Once descrambler 216 receives a full set of register set information, the two entities may be considered synchronous. This process may be known as training descrambler 216. More than one PHY frame 400 may need to be sent to fully train descrambler 216. PHY frame 400 may include data or fields with a seed transfer to train descrambler 216.

In one embodiment, portions of PHY frame payload 406 may be scrambled. In a further embodiment, portions of CRC/H/T/R field 408 may be scrambled. Examples of portions of PHY frame payload 406 that may be scrambled are illustrated in FIGS. 5 and 6.

Figure 5:
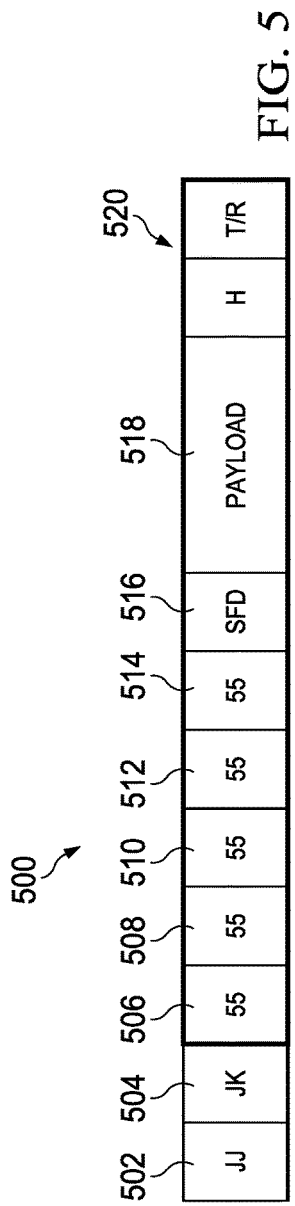
FIG. 5 is a more detailed illustration of portions of a 10SPE communication stream, data packet, or frame that may be scrambled, according to embodiments of the present disclosure.
Figure 6:
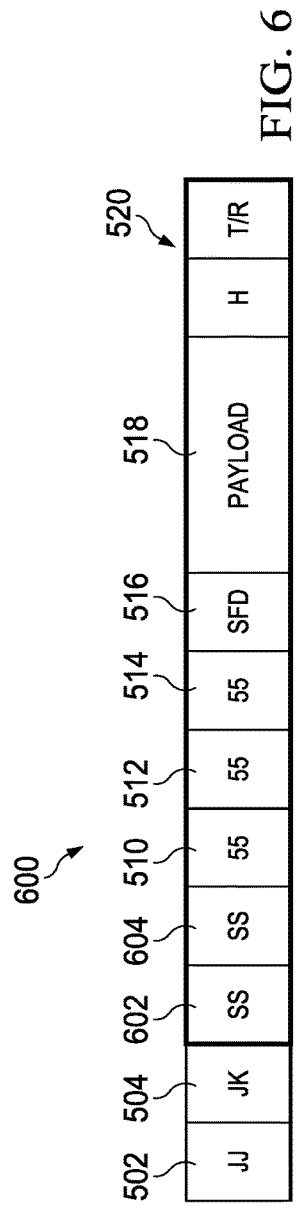
FIG. 6 is another, more detailed illustration of portions of a 10SPE communication stream, data packet, or frame that may be scrambled, according to embodiments of the present disclosure.

FIG. 5 is a more detailed illustration of portions of a 10SPE communication stream, data packet, or frame 500 that may be scrambled, according to embodiments of the present disclosure. Frame 500 may illustrate a more particular example of or example constituent elements of PHY frame 400. Frame 500 may illustrate information that is sent from a transceiver to a transceiver, or from a sender to a recipient. The information may further be reconstructed or analyzed at such a transceiver or recipient. In such a case, frame 500 may illustrate such information as it is received and analyzed. The scrambling may be performed by scrambler 210 and descrambling may be performed by descrambler 216.

Portions of the 10SPE communication stream, data packet, or frame may include portions of a preamble. All or part of a preamble for 10SPE may be shown in FIG. 5. The preamble may include fields 502, 504, 506, 508, 510, 512, 514. In various embodiments, more or fewer fields may be included.

Portions of the SPE10 communication stream, data packet, or frame may include a start frame delimiter (SFD) field 516. The preamble may or may not include SFD field 516. Portions of the SPE10 communication stream, data packet, or frame may include a payload field 518. Payload field 518 may be of a suitable size, may be variable, and is not necessarily the same size as other fields in FIG. 3. SFD field 516 may be scrambled. SFD field 516 may indicate a start of payload or data.

Portions of the SPE10 communication stream, data packet, or frame may include a frame check sequence or CRC/H/T/R field 516. CRC/H/T/R field 520 may include a cyclical redundancy check (CRC), checksum, or other computational result of a mathematical operation performed on payload field 518. CRC/H/T/R field 516 may also include or be followed by an H/T/R designation, indicating one of three cases: ESD (end of stream delimiter); ESDOK (end of stream delimiter ok); or ESDERR (end of stream delimiter error). In one embodiment, CRC/H/T/R field 516 may also be scrambled. In another embodiment, H/T/R designations may also be scrambled.

The preamble may be configured to perform synchronization between a sender and a recipient of the Ethernet data. The preamble may indicate an end to header information.

In 10SPE, contents of payload 518 may be scrambled. In one embodiment, a portion of the preamble shown in FIG. 5 may also be scrambled. The scrambling of a portion of the preamble may be performed with scrambling of payload 518. However, not all of the preamble might be scrambled. In another embodiment, one or more of fields 506, 508, 510, 512, 514 may be scrambled. In yet another embodiment, fields JJ 502 and JJ 504 might not be scrambled. In various embodiments, scrambling of SFD field 516 may be performed or omitted. In the example of FIG. 5, fields 506, 508, 510, 512, 514, 516, 518, and 520 may be scrambled. The preamble may include additional fields preceding field 502, not shown and not scrambled.

Fields 502 (labeled JJ) and 504 (labeled JK) may be octets or words defined by the 4B/5B encoding scheme in the 10SPE standard.

Fields 506, 508, 510, 512, 514 may be fields following the words defined by the 4B/5B encoding scheme. In one embodiment, each of fields 506, 508, 510, 512, 514 may include a hexadecimal value of 55, or a "01010101" byte of data. In one embodiment, all fields following the 4B/5B encoding scheme fields may be scrambled. In another embodiment, a portion of the fields following the 4B/5B encoding scheme fields may be scrambled. In yet another embodiment, all fields of the preamble with a fixed value may be scrambled. In another embodiment, a portion of the fields of the preamble with a fixed value may be scrambled. In yet another embodiment, all fields of the preamble with a hexadecimal value of 55 may be scrambled. In another embodiment, a portion of the fields of the preamble with a hexadecimal value of 55 may be scrambled.

Scrambling may be performed in any suitable manner. Scrambling may be performed by encoding algorithms including instructions for execution by a processor based upon polynomials. The scrambling may be represented by a polynomial such as $$x^{15}+x^4+1$$

The scrambling polynomial may represent a transfer function showing a result of scrambling. The scrambling may be implemented by a series of linear-feedback shift registers (LFSR). The scrambler initial state or set may be given by the set [0 0 1 0 1 0 0 1 1 0 0 0 0 0 1]. These may represent the initial values for the LFSR. Scrambler 210 and descrambler 216 may include circuitry, LFSRs, or other elements in corresponding arrangements such that use of the same initial state, set, or data will yield corresponding results. Scrambler 210 and descrambler 216 may thus, when each has the same data set for the same scrambling polynomial, scramble and descramble the same content.

As discussed above, scrambling may be performed on a combination of a defined portion of the preamble and of the payload, and moreover the payload may be of varying length. While payload field 518 may be of varying length, payload field 518 may be one of, for example, 60, 160, 170, 342, or 1460 bits. Spectrum resolution bandwidth (RBW) may be 10 kHz-100 kHz.

All data after field JK 504 through field 520 may be scrambled. Such data may include an end-of-stream delimiter (ESD) field as well as an ESDOK/ESDERR element. Descrambling may be initialized after receipt of the K of field JK 504.

In one embodiment the JJ field 502 and JK field 504 might not be scrambled. These octets might not be scrambled because they are used for clock and data recovery (CDR). These octets may be used for a quick lock in CDR. n various embodiments, scrambling may be omitted for parts of a preamble used for CDR. In such embodiments, scrambling may be initiated for fields following those used for CDR. In another embodiment, five octets or fields 506, 508, 510, 512, 514 may be scrambled with the preamble in a single scrambler. No changes are needed to the 10SPE frame format, or to PHY-Level Collision Avoidance schemes.

The initial data set [0 0 1 0 1 0 0 1 1 0 0 0 0 0 1] may be considered a seed for scrambling/descrambling. In FIG. 5, this initial data set may be predetermined and known to each of scrambler 210 and descrambler 216. Thus, when scrambling a packet shown in FIG. 5, synchronous scrambling may be performed. Scrambler 210 and descrambler 216 may be reset to the known initial data set after each frame is transmitted and received.

FIG. 6 is another, more detailed illustration of portions of a 10SPE communication stream, data packet, or frame that may be scrambled, according to embodiments of the present disclosure. Frame 600 may illustrate another, more particular example of or example constituent elements of PHY frame 400. Frame 600 is shown using nomenclature of frame 500, where appropriate. Frame 600 may be scrambled in the same manner as frame 500 may be scrambled, discussed above.

In one embodiment, frame 600 may be configured to be scrambled in a self-synchronizing manner. In another embodiment, frame 600 may be configured to be selectively scrambled in either a self-synchronizing manner or in a synchronized manner.

To accomplish this, frame 600 may include synchronization information. Synchronization information may include information of scrambler 210. Scrambler 216 may utilize such information in order to synchronize itself. The information may include a seed, continuing data, or other data from the start or completion of the LFSRs or other circuitry of scrambler 216 that was used to scramble frame 600 or companion frames.

Frame 600 may replace one or more fields of the preamble to include synchronization symbols (SS) or other information. For example, frame 600 may include SS field 602 and SS field 604. These may take the place of fields otherwise including data of "55". Shown at a particular position within the preamble, fields 602, 604 may be located at any suitable location within the preamble. The number of fields that may be used may correspond to the size of the circuitry and LFSRs of scrambler 210. For example, if scrambler 210 includes a sixteen-bit LFSR, then a sixteen-bit synchronization symbol may be included in frame 600. The sixteen-bit synchronization symbol may be divided into two octets and placed into SS fields 602, 604. Fields 602, 604 may be ordered in least significant byte to most significant byte, or from most significant byte to least significant byte.

Scrambler 210 may be configured to set fields 602, 604 with a random seed that itself has used, or a last scrambler state of the previous frame that scrambler 210 processed. If a random seed is used, scrambler 210 may be configured to reset, initialize, and use the same random seed to scramble the frame. If a last scrambler state is used, scrambler 210 may be configured to rotate frames.

In one embodiment, an SS field such as fields 602, 604 might not be scrambled with the remainder of the payload and preamble.

If scrambler 210 and descrambler 216 are to operate in a self-synchronizing mode, frame 600 may nevertheless still be used. In such a case, fields 602, 604 may include training data for descrambler 216

Other approaches might not scramble portions of the preamble that contain the hexadecimal value 55 because such fields are not a repeated string of ones or a repeated string of zeroes.

Figure 7:
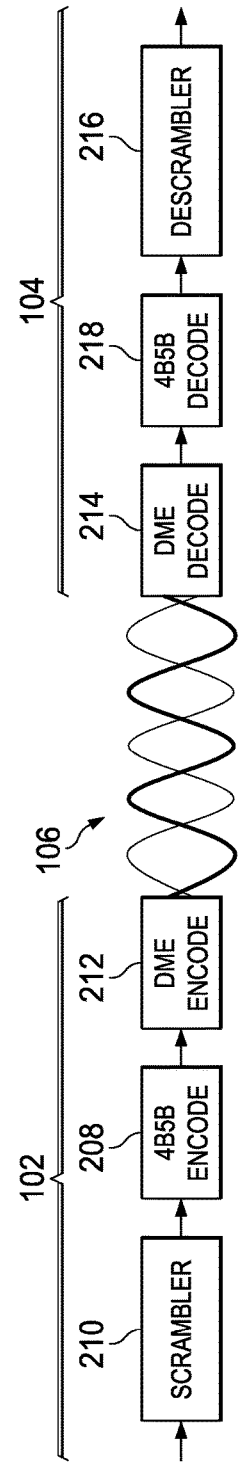
FIG. 7 is another, more detailed illustration of the system for scrambling a payload and a preamble in a packetized data communication system, according to embodiments of the present disclosure.

FIG. 7 is another, more detailed illustration of the system 100 for scrambling a payload and a preamble in a packetized data communication system, according to embodiments of the present disclosure. FIG. 7 illustrates the same elements as FIG. 2. However, FIG. 7 presents the elements of FIG. 2 in a different arrangement or configuration, according to embodiments of the present disclosure. In particular, the position of 4B5B encoder 208 may be exchanged with scrambler 210 in transceiver 102, compared to FIG. 2. Furthermore, the position of 4B5B decoder 218 may be exchanged with descrambler 216 in transceiver 104, compared to FIG. 2.

Accordingly, scrambler 210 may scramble data to be sent to transceiver 104 before it is encoded using 4B5B encoder 208. The scrambled data may be passed to 4B5B encoder 208. Once encoded, 4B5B encoder 208 may pass the results to DME encoder 212. In transceiver 104, data decoded from DEM decoder 214 may be passed to 4B5B decoder 218. Once decoded, 4B5B decoder 218 may pass its results to descrambler 216, which may descramble the results.

By performing 4B5B encoding before scrambling, a resulting frame may have a variation in its structure compared to the structure shown in FIGS. 3-6. For example, the relative positions of fields 402, 404 or 502, 504 may change. Nevertheless, all or a portion of fields following the 4B/5B encoding scheme fields in such a frame may be scrambled. Furthermore, embodiments of the present disclosure may apply scrambling to a combination of part of the preamble in addition to the payload of a data stream or frame, regardless of the position of fields 402, 404, 502, 504.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:
1. An apparatus, comprising:
an encoder circuit; and
a scrambler circuit configured to:
receive a frame, the frame including a preamble and a payload;
scramble contents of the frame including the payload and at least a portion of the preamble;
provide synchronization information with results of scrambling the contents; and send results of scrambling the contents to the encoder circuit.

2. The apparatus of claim 1, wherein the synchronization information includes data from the start or completion of scrambling in the scrambler circuit.

3. The apparatus of claim 1, wherein the synchronization information includes data from shift registers of the scrambler circuit.

4. The apparatus of claim 1, wherein the scrambler circuit is further configured to replace data fields of the frame with the synchronization information.

5. The apparatus of claim 1, wherein the scrambler circuit is further configured to replace data fields of the preamble of the frame with the synchronization information.

6. An apparatus, comprising:
a decoder circuit; and
a descrambler circuit configured to:
receive a frame from the decoder circuit, the frame including a preamble and a payload;
identify synchronization information in the frame; and
using the synchronization information, descramble contents of the frame including the payload and at least a portion of the preamble.

7. The apparatus of claim 6, wherein the synchronization information includes data from the start or completion of scrambling to generate the frame.

8. The apparatus of claim 6, wherein the synchronization information includes data from shift registers of a scrambler circuit that generated the frame.

9. The apparatus of claim 6, wherein the descrambler circuit is further configured to identify data fields of the frame that were replaced with the synchronization information.

10. The apparatus of claim 6, wherein the descrambler circuit is further configured to use the synchronization information to populate shift registers of the descrambler circuit.

11. A method, comprising:
receiving a frame, the frame including a preamble and a payload;
scrambling contents of the frame including the payload and at least a portion of the preamble;
providing synchronization information with results of scrambling the contents; and
sending results of scrambling the contents an encoder circuit.

12. The method of claim 11, wherein the synchronization information includes data from the start or completion of scrambling in the scrambler circuit.

13. The method of claim 11, wherein the synchronization information includes data from shift registers of the scrambler circuit.

14. The method of claim 11, further comprising replacing data fields of the frame with the synchronization information.

15. The method of claim 11, further comprising replacing data fields of the preamble of the frame with the synchronization information.

16. A method, comprising:
receiving a frame from the decoder circuit, the frame including a preamble and a payload;
identifying synchronization information in the frame; and
using the synchronization information, descrambling contents of the frame including the payload and at least a portion of the preamble.

17. The method of claim 16, wherein the synchronization information includes data from the start or completion of scrambling to generate the frame.

18. The method of claim 16, wherein the synchronization information includes data from shift registers of a scrambler circuit that generated the frame.

19. The method of claim 16, further comprising identifying data fields of the frame that were replaced with the synchronization information.

20. The method of claim 16, further comprising using the synchronization information to populate shift registers of the descrambler circuit.

* * * * *